(12) United States Patent
Metsker et al.

(10) Patent No.: US 7,659,701 B1
(45) Date of Patent: Feb. 9, 2010

(54) LIMITING PEAK INPUT POWER

(75) Inventors: Corey Metsker, Clinton, OH (US); Edward Frederick Wright, Middlefield, OH (US)

(73) Assignee: Cisco Technology, Inc., San Jose, CA (US)

( * ) Notice: Subject to any disclaimer, the term of this patent is extended or adjusted under 35 U.S.C. 154(b) by 419 days.

(21) Appl. No.: 11/677,812

(22) Filed: Feb. 22, 2007

Related U.S. Application Data (60) Provisional application No. 60/821,205, filed on Aug. 2, 2006.

(51) Int. Cl.
*G05F 1/00* (2006.01)
(52) U.S. Cl. .................................................. 323/266
(58) Field of Classification Search ................ 323/266, 323/267, 271, 282; 363/65
See application file for complete search history.

(56) References Cited

U.S. PATENT DOCUMENTS

| | | | |
|---|---|---|---|
| 6,212,079 B1 * | 4/2001 | Balakrishnan et al. | ... 363/21.03 |
| 6,979,987 B2 * | 12/2005 | Kernahan et al. | ........... 323/283 |
| 7,002,328 B2 | 2/2006 | Kernahan et al. | |
| 7,061,213 B2 * | 6/2006 | Yoshida | ........................ 323/224 |
| 7,408,333 B2 * | 8/2008 | Chen et al. | .................... 323/282 |
| 7,456,623 B2 * | 11/2008 | Hasegawa et al. | ............ 323/285 |
| 7,501,804 B2 * | 3/2009 | Vo | .............................. 323/282 |
| 7,532,493 B2 * | 5/2009 | Lou et al. | ....................... 363/65 |
| 2005/0116697 A1 * | 6/2005 | Matsuo et al. | ............... 323/282 |
| 2006/0132111 A1 * | 6/2006 | Jacobs et al. | ................. 323/282 |
| 2006/0279970 A1 | 12/2006 | Kernahan | |

* cited by examiner

*Primary Examiner*—Adolf Berhane
*Assistant Examiner*—Yemane Mehari
(74) *Attorney, Agent, or Firm*—Tucker Ellis & West LLP (57) ABSTRACT

In an example embodiment, a primary power supply having an input, an output and a mode selection input. The mode selection input is operative to switch the power supply between a first mode of operation and a second mode of operation. While in the first mode of operation voltage is regulated within a predefined criterion. While in the second mode of operation, voltage at the output is allowed to vary beyond the predefined criteria.

20 Claims, 7 Drawing Sheets

LIMITING PEAK INPUT POWER

CROSS-REFERENCE TO RELATED APPLICATIONS

This application claims the benefit of priority of U.S. Provisional Application No. 60/821,205 filed Aug. 2, 2006.

BACKGROUND

Specifications, such as the Institute of Electrical and Electronic Engineer's (IEEE) 802.3af-2003, specify power consumption limits for a powered device (PD). For example, the IEEE 802.3af-2003 specification specifies the following power consumption limits for a PD:

1. average input power shall not exceed 12.95 W; and
2. peak power shall not exceed 12.95 W for more than 50 ms maximum and 5% duty cycle.

The second condition can present problems to devices such as 802.11 compliant radios because power consumption of a radio is typically higher in transmit mode than in receive mode.

Typical solutions to the aforementioned problem include 1) consume less power at peak consumption mode (e.g., use less transmit (TX) power), 2) consume less power in general, such as reducing CPU power through clock reduction or feature reduction such as less DRAM, low-speed Ethernet, etc., and/or 3) not operating with a Power over Ethernet (PoE) or other supply with limited maximum input power. However, all of these solutions introduce feature or product degradation.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment described herein, there is disclosed a power supply having an input, an output and a mode selection input. The mode selection input is operative to switch the power supply between a first mode of operation and a second mode of operation. While in the first mode of operation voltage is regulated within a predefined criterion. While in the second mode of operation, voltage at the output is allowed to vary beyond the predefined criteria.

In an example embodiment described herein, there is disclosed herein a method for operating a switching power supply having an input voltage and an output voltage. The method comprises operating the switching power supply in a first mode, wherein the output voltage is regulated by feedback. The method further comprises switching to a second mode of operation by increasing a duty cycle of a signal controlling operation of the switching power supply until feedback is ineffective to regulate the output voltage.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention.

DESCRIPTION OF EXAMPLE EMBODIMENTS

Throughout this description and examples shown should be considered as examples, rather than limitations, of the present invention. The figures generally indicate the features of the examples, where it is understood and appreciated that like reference numerals are used to refer to like elements.

Figure 1:
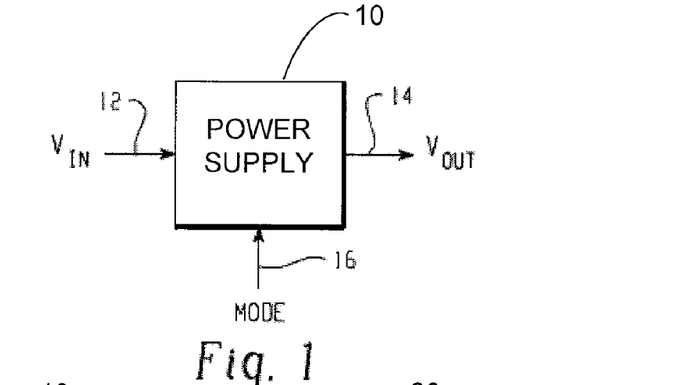
FIG. 1 is a block diagram of a power supply in accordance with an example embodiment.

Referring to FIG. 1, there is illustrated a block diagram of a power supply 10 configured in accordance with an example embodiment. Power supply 10 comprises an input (Vin) 12, an output (Vout) 14 and a mode selection input 16. Mode selection 16 is operative to switch power supply 10 between a first mode of operation and a second mode of operation.

In the first mode of operation, the output voltage (Vout) 14 is tightly regulated. For example, Vout is maintained within a predefined criterion (e.g. a desired range such as within 5% of the desired output voltage). In an example embodiment, Vout 14 regulated by Vin, e.g. Vout=kVin. In an example embodiment, feedback is used to regulate Vout. In this mode of operation, because Vout is rightly regulated, input power tracks output power. This mode of operation may be referred to herein as closed loop.

In closed loop mode, power supply 10 operates similar to a switching power supply, such as an isolated forward, isolated flyback or non-isolated buck, which is designed to maintain a specified tolerance on the output voltage. Control loops adjust the switching duty cycle in response to measured changes in output voltage. Because the output voltage is tightly regulated (e.g. within 5%), input power will closely track output power. Therefore, in this mode, input power can exceed a predefined limit when output power is maximized.

However, the second mode of operation allows the output voltage to vary (e.g. the output voltage is not tightly regulated and allowed to vary or droop beyond the predefined criteria). In this mode switching duty cycle is not adjusted in response to changes in voltage at output 14, and therefore input power does not track output power. This mode of operation is referred to herein as open loop.

By not tightly regulating the voltage at output 14, the open loop mode allows input power (power at input 12) to be averaged over a time period, such as when the output power peaks at a level above the maximum input power. In an example embodiment, power supply 10 can be employed by a wireless transceiver (e.g. an 802.11 transceiver). The input power is averaged over a long time relative to the time the transmitter is in operation (e.g. 802.11 packet TX time) thus reducing the peaks in input power.

Figure 2:
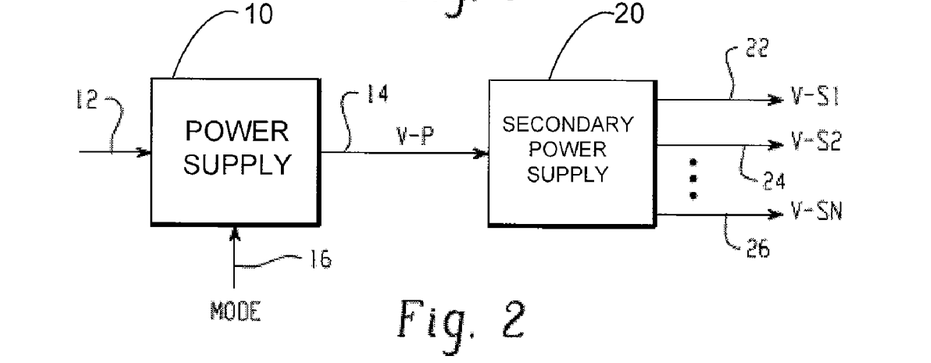
FIG. 2 is a block diagram of a two stage power supply configured to limit peak input power into a system.

Referring to FIG. 2, there is illustrated a block diagram of a two stage power supply that allows "averaging" of input power. The power supply comprises a primary supply 10 that receives input power at input 12 and produces an output voltage (V-P) at output 14. The output voltage from the primary supply (V-P) is supplied to at least one secondary supply 20 that supply regulated supply voltages (e.g., V-S1 22, V-S2 24, . . . V-SN 26).

As was described above, primary supply 10 can be configured for two modes of operation, the first mode where output voltage is tightly regulated and the second mode where the output voltage is not tightly regulated. In order to enable input power averaging, power supply 10 operates in the second mode and the output voltage (V-P) of the primary supply 10 is not tightly regulated. Secondary power supply 20 output stages (V-S1 22, V-S2 24, . . . V-SN 26) provide tightly regulated voltage rails as necessary for standard device/circuit operations. For example, in an example embodiment, an access point (AP) that comprises a plurality of wireless transceivers can be configured to operate with the output of the primary supply (V-P) at 12V. In the closed loop mode, the output 12 of primary power supply 10 is maintained within 5% if 12V. However, in the open loop mode, the 12V output is not tightly regulated, but allowed to vary beyond the 5% m such as between, 9V-15V (e.g. roughly plus or minus 33%).

If primary power supply 10 employs a switching duty-cycle supply, primary power supply 10 can be configured so that the duty cycle is dependent on input voltage feedback instead of output voltage in the closed loop mode. Furthermore, as will be described in more detail herein, the primary supply can employ larger reactive components relative to those in standard power supply design. For example, an inductor sized to limit the rate at which input power increases naturally (without V-out feedback induced duty-cycle adjustment) can be employed. As another example, the primary supply can employ a capacitor sized to ensure that primary supply output voltage remains in allowable range based upon maximum output power (relative to input power) and time for which maximum output power is present.

Figure 3:
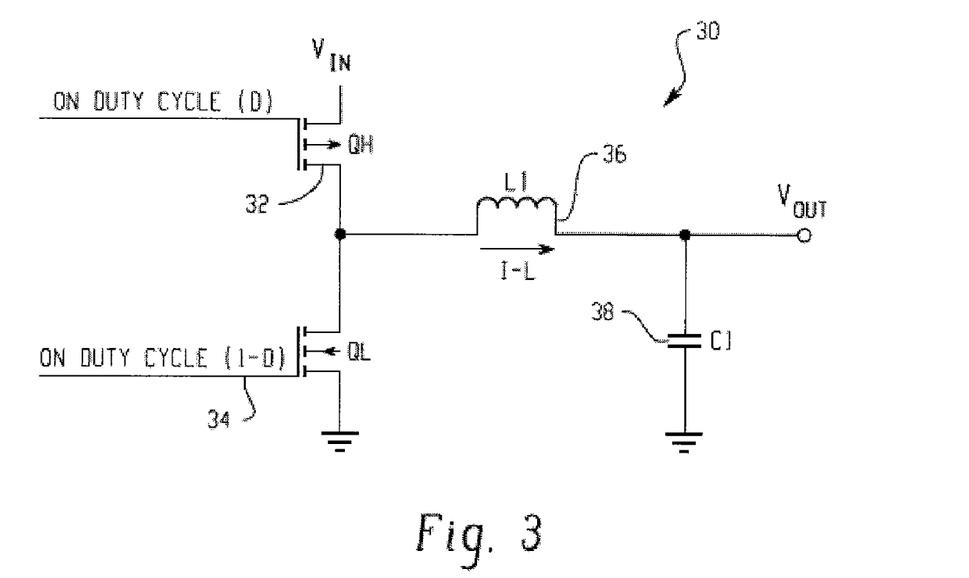
FIG. 3 is a circuit diagram of a switching power supply.

FIG. 3 is a circuit diagram of a switching power 30 supply suitable for primary supply 10 described in FIGS. 1 and 2. The supply 30 illustrated is a buck converter, however the same concepts described herein can be applied to either isolated forward or flyback converters as well as non-isolated buck converters. Switching power supply comprises transistors 32, 34. An inductor 36 is coupled between transistors 32, 34 and a capacitor 38 is coupled across transistor 34. The voltage across capacitor 38 is the output voltage (Vout) of the supply.

In operation, during a first portion of a duty cycle, transistor 32 is switched on while transistor 34 is switched off. During a second portion of the duty cycle, transistor 34 is switched on while transistor 32 is switched off. If the first portion of the duty cycle is represented as D, the on duty cycle for transistor 32 is D, while the on duty cycle for transistor 34 is (1−D).

Figure 4:
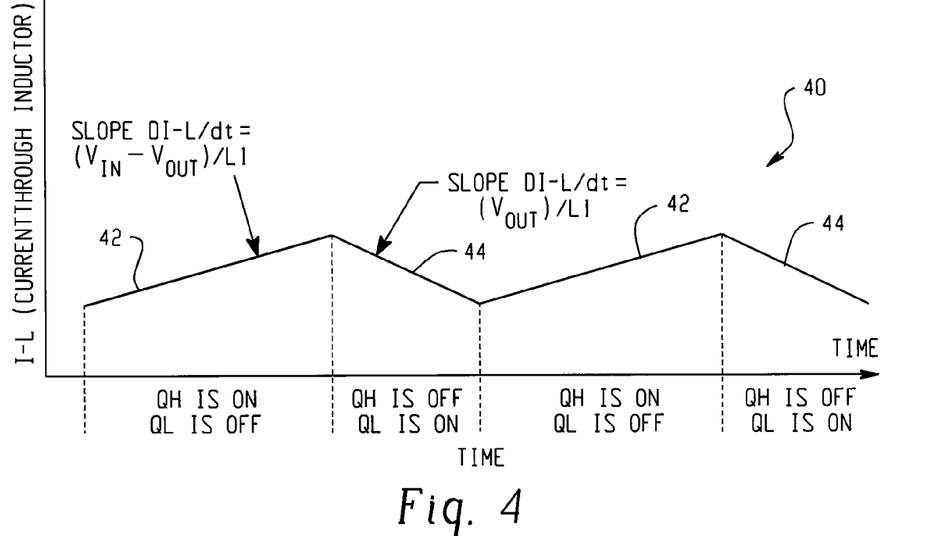
FIG. 4 is an example signal diagram of current over a duty cycle for a switching power supply.
Figure 5:
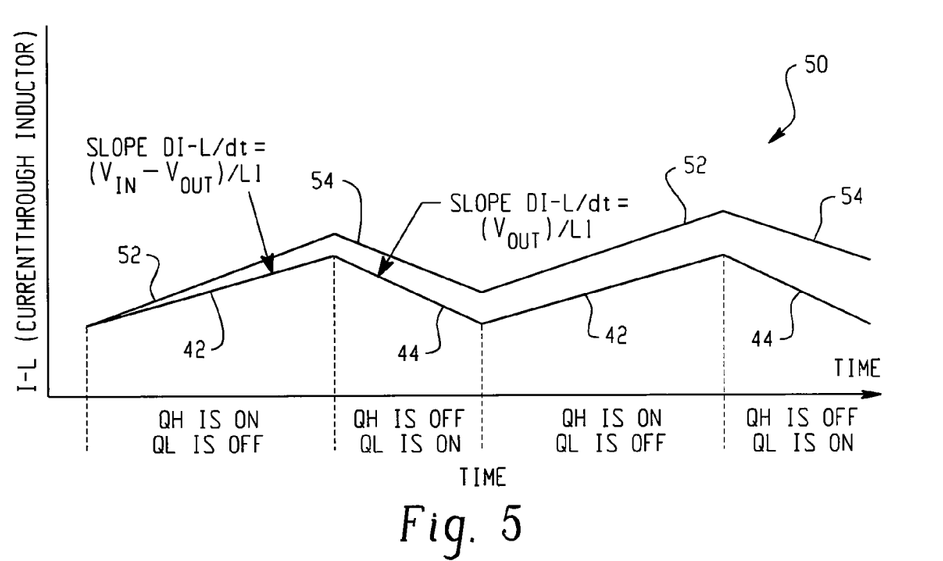
FIG. 5 is an example signal diagram of current over a duty cycle for a switching power supply with various loads.

For purposes of this discussion, V-in is assumed to be fixed and it is assumed that no duty-cycle adjustment is performed based on output voltage (Vout). With a fixed duty cycle and a steady state load, the current through the inductor ramps up and down at the switching frequency as illustrated in FIG. 4. The slope of inductor current over time is illustrated in FIG. 5. The slope 52 during the rising part 42 of the duty cycle is (V-in−V-out)/L1. The slope 54 during the decreasing part 44 of the duty cycle is −V-out/L1. When the load increases, V-out naturally decreases, resulting in an increasing of the rising slope (because V-in−V-out increases) and a decrease in the falling slope (because V-out decreased).

Thus, in an example embodiment the selected inductance for inductor L1 is sufficiently large such that the I-L increase rate is minimized during time period of peak power consumption. For example, if the device is an access point comprising one or more wireless transceivers, the time period when the one or more transceivers are transmitting would be the time period of peak power consumption. Because V-in is fixed, input power directly relates to inductor current (I-L). Inductor size will be directly related to the amount of ripple on input power, which is not the ripple of the power supply switching frequency, but rather the ripple at the frequency of high-power vs. low-power state changes (e.g. the frequency of radio TX vs. radio RX state changes).

The rate at which charge leaves C1 when output power is maximum is defined by: (I-out−I-L)=C1*(dV-out/dt). Therefore, in an example embodiment C1 is selected to be sufficiently large such that V-out remains within an allowable range during the time period of worst case (peak) power consumption.

Figure 6:
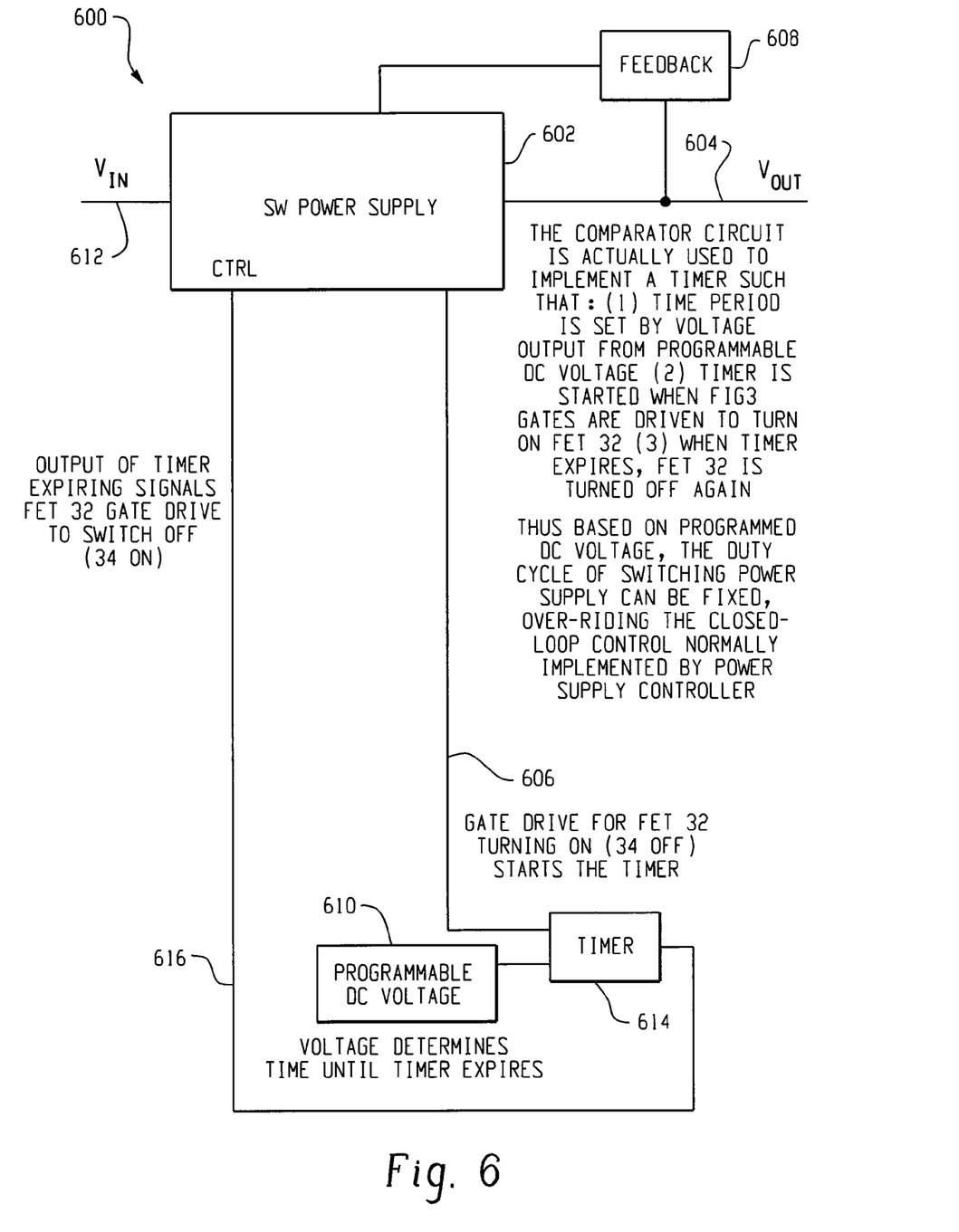
FIG. 6 is a block diagram of a power supply configured to limit peak input power.

FIG. 6 is a block diagram of a power supply 600 configured to limit peak input power by employing power averaging. Power supply 600 comprises a switching power supply 602 that has a voltage input (Vin) 612 and a control input (CTRL) and an output 604 that provides an output voltage (Vout).

Switching power supply 602 provides a signal 606 to timer 614 that indicates the current state of switching power supply 602. For example, if switching power supply employs the circuit described in FIG. 3, signal 606 is indicative of when FET 32 is switching ON and FET 34 is switching OFF. A control signal 616 is fedback from timer 614 to switching power supply 602 to control the duty cycle of switching power supply 602 (e.g. to indicate when to switch FET 32 OFF and FET 34 ON if using the circuit described in FIG. 3). The duty cycle is controlled by Programmable DC voltage 610

For closed-loop mode, programmable DC voltage 610 is set to 0, thus signal 616 to the CTRL input of switching power supply 602 never goes active, therefore switching power supply 602 is never forced to switch based on feedback from timer 614 but rather turns switches based on feedback from feedback circuit 608 coupled to Vout 604.

To switch to open-loop mode, programmable DC voltage 610 is increased to a fixed level. This forces signal 616 to CTRL to go active, causing switching power supply 602 to switch for some fixed time. The time period that switching power supply 602 switches (e.g. FETs 32 and 34 are in ON/OFF states), is the duty cycle "D" of switching power supply 602. The duty cycle is related to the voltage of programmable DC voltage level 610. Feedback circuit 608 provides feedback indicating that the open-loop mode is entered as V-out 604 drops to a level below that regulated in open-loop mode.

In the open loop mode of operation, the voltage at output 604 is not tightly regulated and allowed to vary beyond the predetermined range of the first mode of operation.

Figure 7:
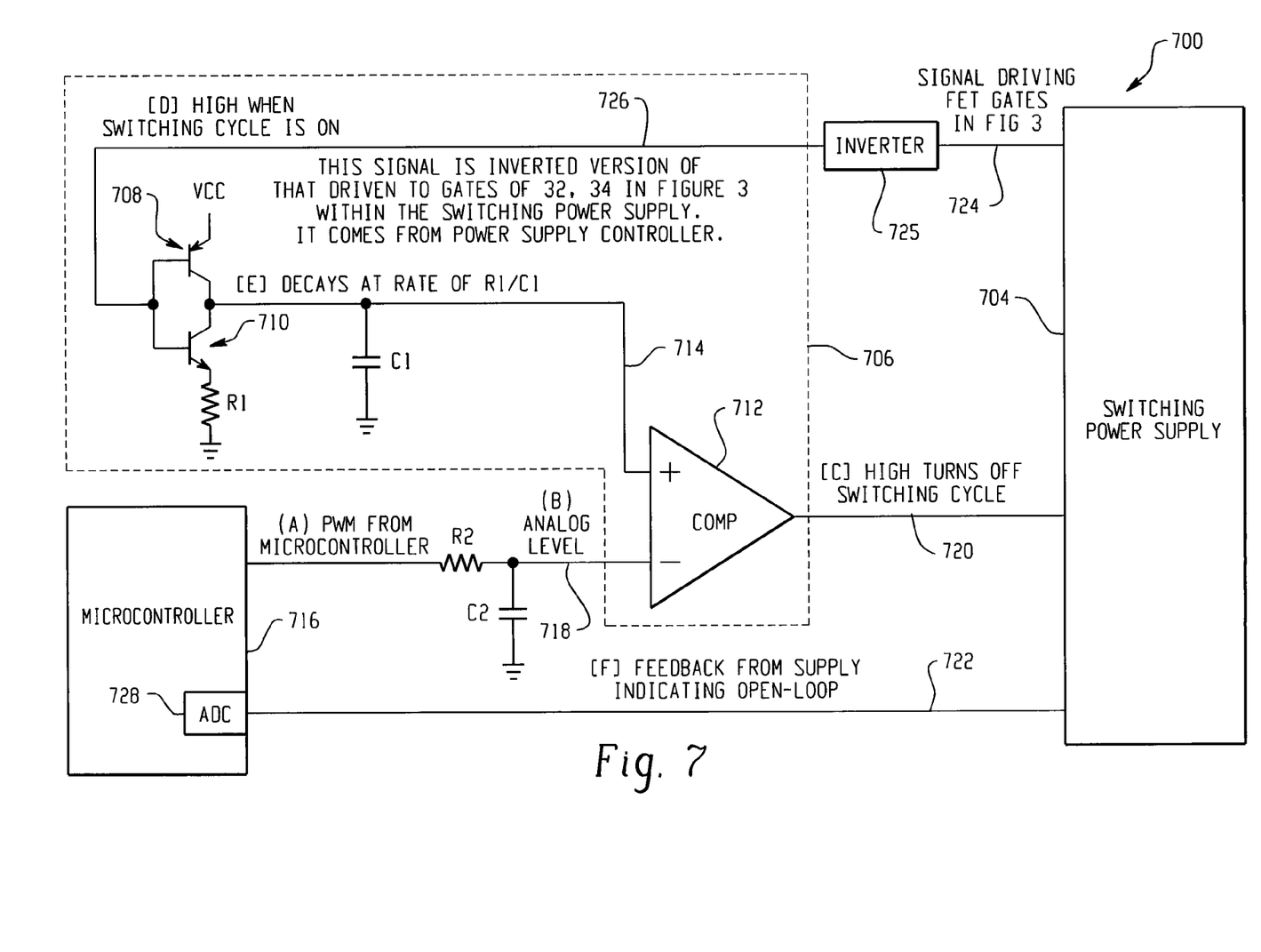
FIG. 7 is a detailed circuit diagram of a power supply configured to limit peak input power.

FIG. 7 is a detailed circuit diagram of a power supply 700 configured to limit peak input power. Switching power supply 704 is suitably any switching power supply wherein the switching of the power supply operates to control the output voltage of the power supply. For example, circuit 300 illustrated in FIG. 3 is suitably adapted for switching power supply 704. A timing circuit (e.g. a circuit which can perform the functionality of timing circuit 614 in FIG. 6) 706 is formed by transistors 708, 710, R1, C1 and comparator 712. A programmable DC voltage is provided by Microcontroller 716, R2 and C2 Microcontroller 716 generates a pulse width modulated (PWM) signal that is filtered by R2 and C2 before being input into the "—" input 718 of comparator 712.

Signal 724 is inverted by inverter 725 and provides an inverted version 726 of signal 720 used to switch switching power supply 704 (for example the signal to drive to GATES of 32,34 in FIG. 3 within the switching power supply 704. In an example embodiment employing where switching power supply employs the switching power supply described in FIG. 3, signal 726 goes HIGH when transistor 32 is switched ON.

Microcontroller 716 has logic for generating a pulse width modulated (PWM) signal for controlling the operation of primary power supply 704. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In operation, microcontroller 716 programs a DC voltage by setting a duty cycle on a PWM signal. R2/C2 filters the PWM signal into a DC value. Signal 726 switches high when the switching cycle is on, for example when using the circuit described in FIG. 3, FET 32 is on and FET 34 is off. The switching cycle is driven by power controller IC based on fixed switching frequency. When 726 switches HIGH, transistor 710 switches ON and transistor 708 switches OFF. When transistor 710 switches ON, C1 charges slowly through R1.

When the "+" input 714 of comparator exceeds the "−" input 718, comparator 712 provides signal 720 which is a feedback signal operable to switch switching power supply 704 (e.g. to power controller IC to turn OFF FET 32 and ON FET 34 when using the circuit described in FIG. 3).—thus 724 goes high. Signal 726 changes to a Low state, which switches ON transistor 708 and switches OFF 710 instantaneously. Signal 726 is responsive to switch to the high state and the cycle repeats.

Signal 722 is an analog voltage read by an microcontroller ADC 728 which represents the output voltage of Primary supply. Signal 722 is used by microcontroller 716 to determine when power supply 700 is in the open loop mode or the closed loop mode.

When in open loop mode, the output of the primary switching supply can be represented by Vo=Vin*D*k, where D is the duty cycle. Thus, because Vin and k are constant, Vo becomes a function of the duty cycle "D".

To determine an appropriate initial duty cycle for a given Vin, the feedback signal 722 indicating Vo to microcontroller 716 is monitored and the PWM signal is adjusted. At a given input voltage, the microprocessor increases the PWM until feedback signal 722 indicates that the normal closed-loop voltage feedback control is having no effect and the output voltage of 704 is below the normally regulated closed-loop mode voltage. Once an initial duty cycle for Vin has been determined, the duty-cycle can be adjusted for variations in Vin over time. Temperature compensation of the PWM may also be implemented, depending on the design. If the range of Vo is wide enough (e.g. for the above example 8-15V for a 12V system) and circuit variations over temperature are small enough, then temperature compensation can be ignored.

The power averaging function described above can be disabled. Logic coupled to switching power supply microcontroller 704 can by employed to force closed-loop operation by setting PWM duty cycle of microcontroller 716 such that zero volts is seen at '−' terminal 718 of comparator 712. If power averaging is disabled, then the primary supply output voltage (Vo) will be tightly regulated (e.g. for a within 0.5V for 15V supply, or +/−5%). The ability to disable power averaging provides flexibility. Power supply 700 can use power averaging for systems that have tight power specifications such as 802.3af compliant systems or power supply output voltage can be tightly regulated for systems that have a stricter requirement for voltage regulation than power regulation.

Figure 8:
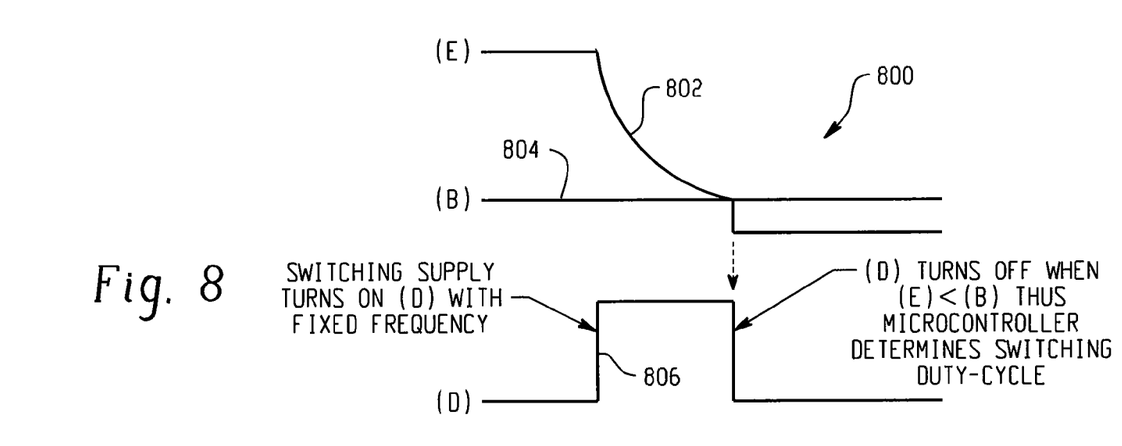
FIG. 8 is an example signal diagram for the circuits illustrated in FIGS. 7 and 8.

FIG. 8 is a signal diagram 800 for the circuits illustrated in FIG. 7. Signal 804 is the "−" comparator input (718 in FIG. 7). Signal 802 is "+" comparator input (714 in FIG. 7). Signal 806 is an inverted gate drive signal to switching power supply 704 (e.g. if using a circuit similar to FIG. 3 FETS, 806 is high to indicate transistor 32 is on and transistor 34 is off). As can be observed from FIG. 8, when signal 726 goes high, signal 802 starts to decay. Signal 802 decays at a rate of R1/C1. When signal 802 becomes less than signal 804, this switches the output of comparator 720 to high, switching off the duty cycle, which switches off signal 726 represented by signal 806. Thus, microcontroller 716 determines the switching duty cycle by setting the voltage level of signal 804.

Figure 9:
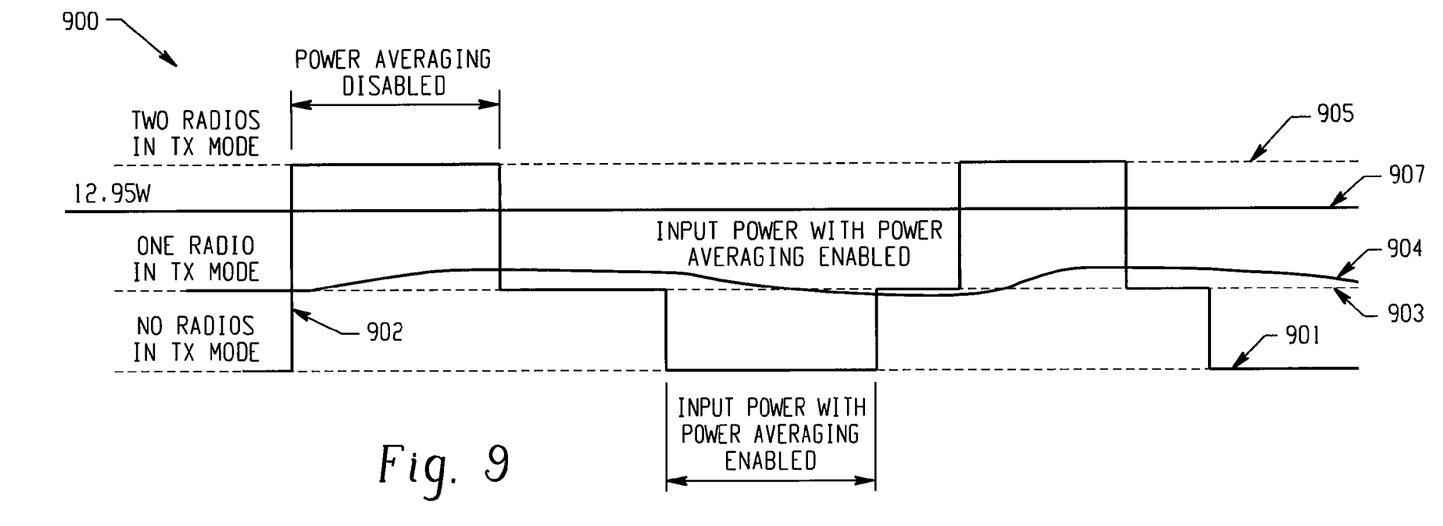
FIG. 9 is an example power consumption diagram comparing power consumption of a power supply with power averaging with the power consumption of a power supply without power averaging.

In an example embodiment, circuit 700 is employed to power a wireless access point (not shown) with a plurality of transmitters. FIG. 9 illustrates an example 900 of power consumption when circuit 700 operates in the first (closed loop) mode of operation and when circuit 700 operates in the second (open loop) mode of operation. In this example, the desired peak maximum input power is 12.95 watts illustrated by 907. When no radios are transmitting, the power consumption is illustrated by 901. When one radio is transmitting, the power consumption is illustrated at 903. When two radios are in transmit mode, the power consumption is illustrated by 905, which is above the desired maximum transmit consumption illustrated by 907. Plot 902 illustrates the power consumption for the access point when power averaging is not used (e.g. the power supply is operating in closed loop mode). As can be observed from 902, when both radios are transmitting, the peak power consumption 905 is above the maximum power consumption illustrated by 907. However, by employing power averaging, as illustrated by 904, the maximum input power consumption is not above the maximum power consumption illustrated by 907.

Figure 10:
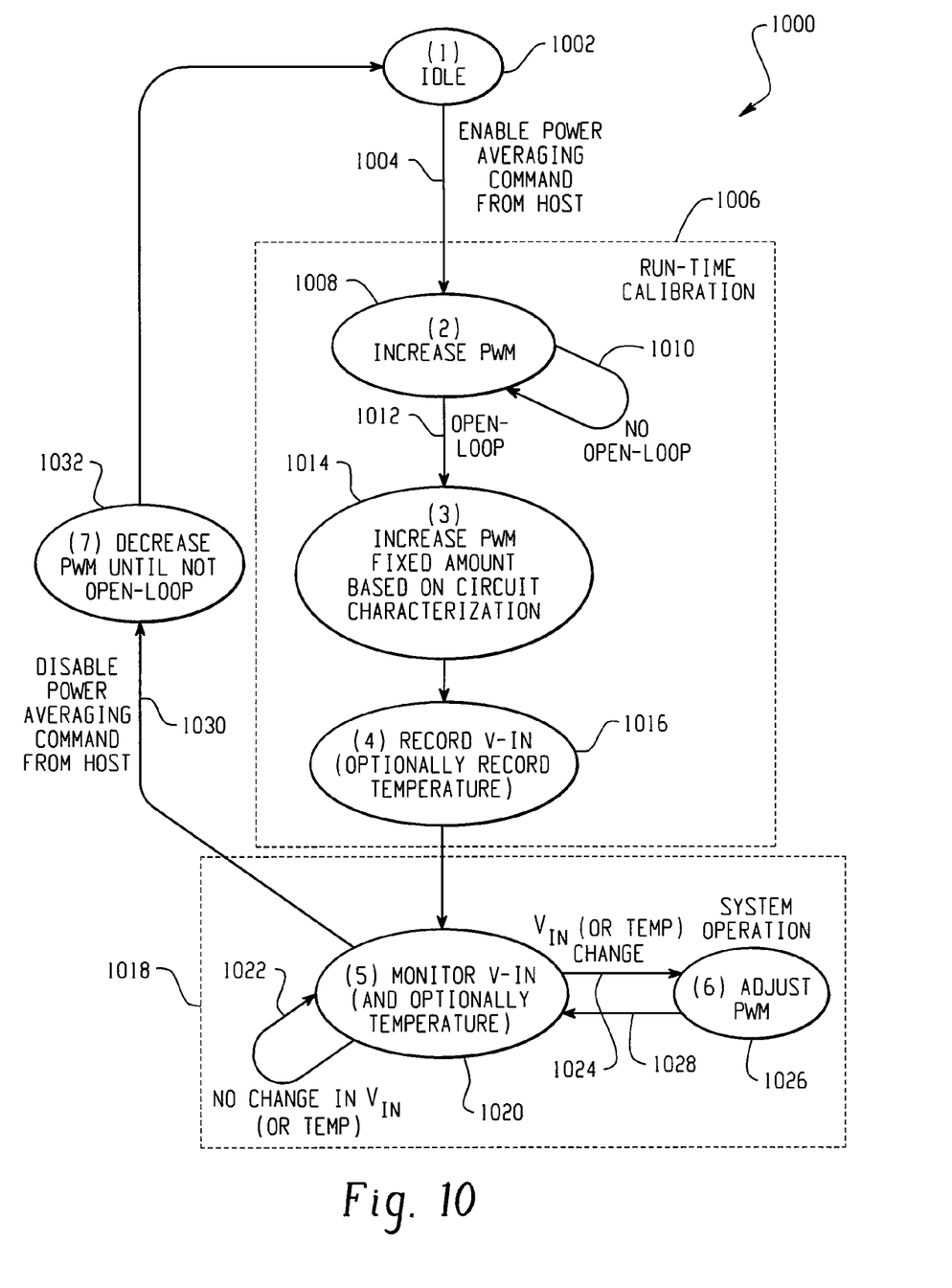
FIG. 10 is a state diagram for a power supply that utilizes input power averaging.

FIG. 10 is a state diagram 1000 for a switching power supply that utilizes input power averaging, such as for example power supply 600 illustrated in FIG. 6 or power supply 700 illustrated in FIG. 7. At 1002, the system is shown as "IDLE" can be operating in an first, closed loop or voltage regulating mode. A command can be issued at 1004 to enable power averaging. The system enters a Run-Time calibration mode 1006 beginning with state 1008. At state 1008, the duty cycle of the PWM signal to input 718 comparator 712 is increased. The duty cycle continues to increase until a feedback signal (e.g. signal 722) indicates that the switching power supply is operating in an open loop mode, wherein the output voltage is no longer controlled by feedback to the switching power supply, but instead the output voltage is determined by the duty cycle of the PWM signal (e.g. the PWM signal received at the "—" input of comparator 712. As illustrated by 1012, once open loop mode is detected the state 1014 is entered.

At state 1014 the PWM signal is increased a fixed amount based on circuit characterization. There are two trade-offs to consider in determining the additional PWM increase. First the PWM should be increased sufficiently to increase stability. The primary supply switching frequency varies over temperatures. Secondly, the PWM signal should not be set too high or the output voltage will be set unnecessarily low. In an example embodiment, the necessary PWM increase can be characterized by looking at output voltage variation over temperature range with a fixed duty-cycle.

After the PWM is increased, state 1016 is entered and the input voltage to the power supply (e.g. Vin in FIG. 7) is recorded. Optionally, the temperature is also recorded.

After state 1016, system operation mode 1018 commences. System operation mode 1018 starts at state 1020. At state 1020 the input voltage (Vin) and optionally the temperature) are monitored. If no change in input voltage (or temperature) is detected then as illustrated by 1022 state 1020 is maintained. However, if a change in input voltage (and/or temperature) is detected, then as illustrated by 1024 the state 1026 is initiated. At state 1026 the PWM signal is adjusted, then as shown by 1028, state 1020 resumes.

System operation mode 1018 continues until as illustrated by 1030 a command is received to disable power averaging. After the command to disable power averaging is received, state 1032 is implemented. At state 1032 the PWM signal is increased until the switching power supply is no longer operating in an open loop mode (e.g. it is operating in a closed loop mode). After state 1032 has completed, state 1002 is initiated.

Figure 11:
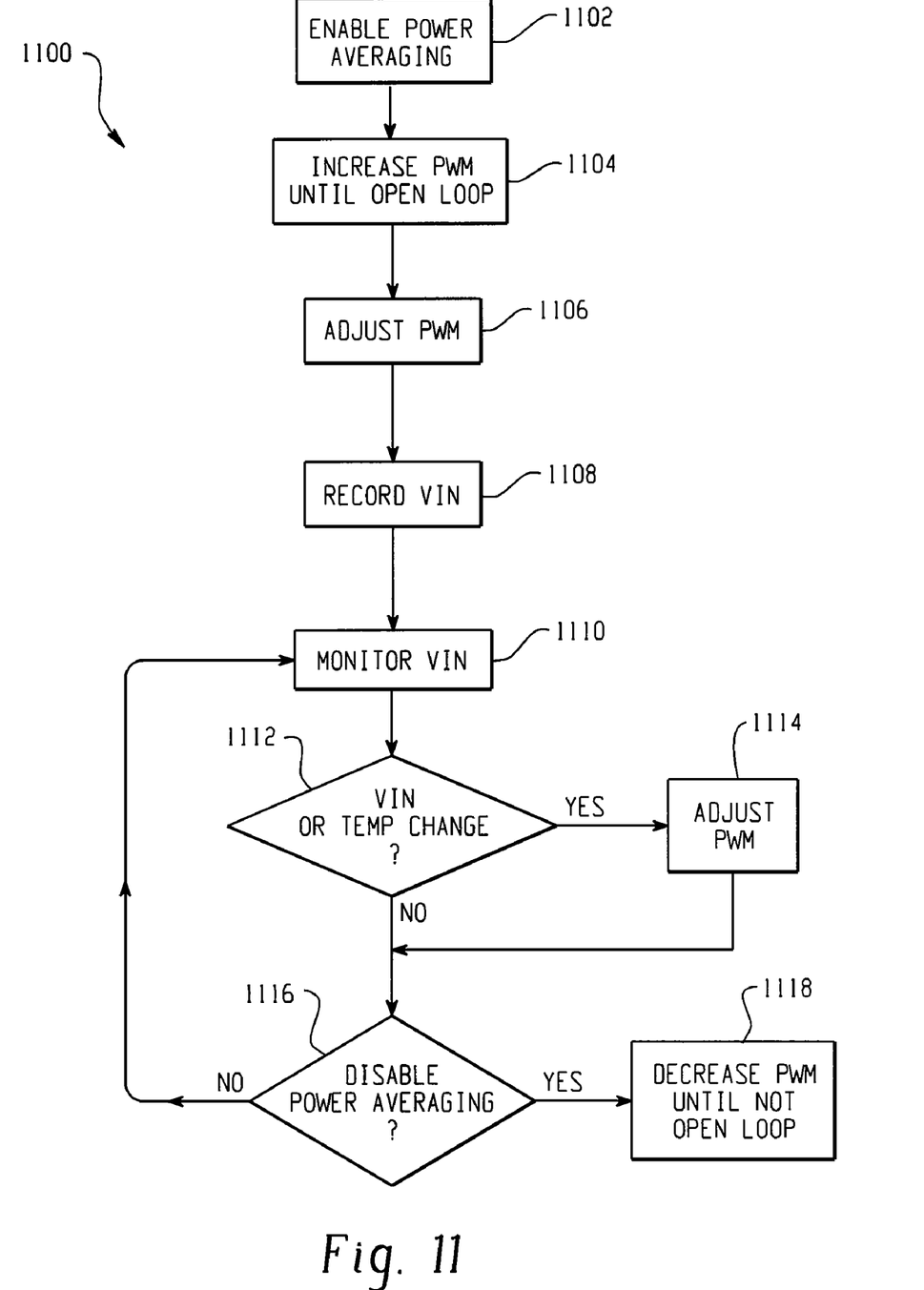
FIG. 11 is a block diagram of a methodology.

In view of the foregoing structural and functional features described above, a methodology 1100 in accordance with various aspects of the present invention will be better appreciated with reference to FIG. 11. While, for purposes of simplicity of explanation, the methodology 1100 of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

Power supply 600 (FIG. 6) and 700 (FIG. 7) may be referred to in order to aid in clarifying steps of methodology 1100. Methodology 1100 is suitable for controlling the operation of a power supply, such as a switching power supply, with an input having an input voltage and an output having an output voltage to facilitate input power averaging. The power supply is configured to operate in two modes of operation. The first mode of operation, the closed loop mode, employs feedback to regulate the output voltage of the power supply. In the second mode of operation, the open loop mode, does not employ feedback to regulate the output voltage. In an example embodiment, the output voltage in the first mode of operation is tightly regulated, for example it does not vary beyond a predefined criteria such as a fixed percentage (e.g. 5%, 10%), and the output voltage in the second mode of operation is allowed to vary beyond the predefined criteria (e.g. 33%).

The power supply operates in the first, open loop, mode until a command is received to switch to the second mode. For example, at 1102 a command can be received to enable power averaging. Alternatively, the command can instruct the power supply not to tightly regulate the output voltage.

At 1104, the duty cycle of a signal used to control the operation of the power supply is increased until the open loop mode is reached. For example, microprocessor 716 increased the PWM duty cycle, which results in a higher level analog signal at input 718. Microprocessor 716 continues to increase the duty cycle of the PWM signal until feedback signal 722 indicates that the switching power supply 706 is operating in an open loop mode. In open loop mode, the output voltage is no longer controlled by output voltage feedback to switching power supply 704, but is determined by the duty-cycle of the PWM signal sent by microprocessor 716. In an example embodiment, in the open loop mode the output voltage (Vout) is a function of the input voltage (Vin), the duty cycle (D) and a constant (k). The relation ship of Vout to Vin is, Vout=Vin*D*k. Because Vin to the power supply is fixed, Vout becomes a function of D, the duty cycle of the PWM signal.

At 1106 the PWM signal is adjusted. Microprocessor 716 increased the PWM a fixed amount based on the characterization of the system and has the effect of lowering the output voltage. For example, microprocessor 716 increases the PWM a fixed amount beyond where the open loop mode was entered. This step provides a margin of system stability. This prevents the power supply from leaving the open loop mode responsive to changes in load. This step may also be used to provide stability against temperature changes and obviate the need for temperature compensation.

At 1108 the input voltage (Vin) is recorded so that compensation for input voltage changes can be performed. Optionally, temperature may also be recorded for temperature compensation.

At 1110, Vin is monitored. Optionally, temperature may also be monitored. Monitoring can be performed by microprocessor 716. At 1112, it is determined if Vin (and/or optionally the temperature) changed. If Vin (and/or optionally temperature) changed (YES), at 1114 microprocessor 716 adjusts the PWM accordingly based upon system characterization over the operational voltage/temperature range. To maintain a desired output voltage (e.g. high enough to operate the system and achieve desired efficiencies, and low enough to continue operating the switching supply in an open loop mode where microprocessor 716 maintains control of the output voltage), microprocessor 716 us adjusts the duty cycle of the switching supply responsive to changes in input voltage. Depending upon the implementation, temperature compensation may also be implemented. If at 1112 it is determined neither VIN nor (optionally) the temperature changed (NO), then processing continues to 1116.

At 1116, a command is received to disable power averaging. The command can be sent by a host processor controlling the apparatus being serviced by the power supply. If a command is received to disable power averaging (YES), then at 1118 microprocessor 716 decreases the duty cycle of the PWM signal until the power supply is not operating in the open loop mode (e.g. the feedback is again operating to regulate the output voltage). If a command was not received to disable power averaging (NO) then at 1110 Vin (and optionally temperature is again monitored). Steps 1110, 1112, 1114 and 1116 may be continuously repeated until operation of the open loop (power averaging) mode is no longer desired.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

What is claimed is:

1. An apparatus, comprising:
   a primary power supply having an input, an output and a mode selection input;
   wherein the mode selection input is operative to switch the power supply between a first mode of operation and a second mode of operation;
   wherein the first mode of operation is a closed loop where input power tracks output power and output voltage is regulated within a predefined criteria; and
   wherein the second mode of operation is an open loop where input power is independent of output power, and voltage at the output is allowed to vary beyond the predefined criteria.

2. An apparatus according to claim 1 further comprising a second power supply having an input and an output, the input of the second power supply is coupled to the output of the primary power supply, wherein voltage at the output of the second power supply is regulated within a second predefined criteria.

3. An apparatus according to claim 1, the primary power supply further comprises a switching power supply having an input and an output.

4. An apparatus according to claim 1, the primary power supply further comprises an isolated buck converter that comprises a first controllable switching device and a second controllable switching device and a gate input coupled to the first controllable switching device and the second controllable switching device, the gate input is configured so that the first controllable switching device is on during a first part of a duty cycle and the second controllable switching device is off during the first part of the duty cycle, and the first controllable switching device is off during a second part of the duty cycle and the second controllable switching device is on during the second part of the duty cycle.

5. An apparatus according to claim 2, wherein the second predefined criteria is the same as the first predefined criteria.

6. An apparatus according to claim 3, wherein the switching power supply is one of a group consisting of an isolated buck converter, an isolated forward converter, an isolated flyback converter and a non-isolated buck converter.

7. An apparatus according to claim 4, further comprising:
   a timing circuit having two inputs and an output, the first input is coupled to the gate input; and
   a programmable voltage supply coupled to the second input of the timer;
   wherein the output of the timing circuit is fedback to the switching power supply to control the duty cycle.

8. An apparatus according to claim 7, further comprising:
   the timing circuit comprises a comparator having first and second inputs;
   wherein the first input is coupled to the gate input;
   wherein the second input is coupled to the programmable voltage supply; and
   wherein the programmable voltage supply provides a pulse width modulated signal.

9. An apparatus according to claim 8, further comprising control logic coupled to the programmable voltage supply for controlling a duty signal of the pulse width modulated signal.

10. An apparatus according to claim 9, wherein feedback from the output of the primary power supply is employed to regulate the output voltage while in the first mode of operation.

11. An apparatus according to claim 9, further comprising:
    a voltage feedback control circuit from the output of the comparator to the gate input; and
    a feedback circuit from the primary power supply to the control logic providing the control logic with data indicating to the control logic whether the primary power supply is operating in one of the first mode and the second mode;
    wherein the control logic is configured to switch the primary power supply to the second mode of operation by increasing the duty cycle of the pulse width modulated signal until the feed back circuit from the comparator indicates that voltage feedback control is ineffective.

12. The apparatus according to claim 11, wherein the control logic is operable to increase the duty cycle of the pulse width modulated signal a fixed amount beyond the duty cycle of when the comparator indicated that voltage feedback control was ineffective.

13. The apparatus according to claim 11, wherein the control logic is responsive to adjust the duty cycle of the pulse width modulated signal responsive to a change in voltage at the output of the primary power supply.

14. The apparatus according to claim 11 wherein the control logic is responsive to adjust the duty cycle of the pulse width modulated signal responsive to a change in ambient temperature.

15. The apparatus according to claim 11, wherein the control logic is operable to switch to the first mode of operation by decreasing the duty cycle of the pulse width modulated signal until the feed back circuit from the comparator indicates that voltage feedback control is effective.

16. A method, comprising:
    operating a switching power supply having an input voltage and an output voltage in a first mode, wherein the output voltage is regulated by feedback;
    increasing a duty cycle of a signal controlling operation of the switching power supply until feedback is ineffective to regulate the output voltage; and
    operating the switching power supply in a second mode, responsive to the feedback being ineffective to regulate the output voltage, wherein the input voltage is independent of output voltage.

17. A method according to claim 16 further comprising increasing the duty cycle of the signal controlling operation of the switching power supply a fixed amount beyond where the feedback is ineffective to regulate output voltage based on circuit characterization.

18. A method according to claim 16, further comprising
    recording the input voltage responsive to feedback being ineffective to regulate the output voltage; and
    adjusting the duty cycle of the signal controlling operation of the switching power supply responsive to the input voltage varying from the recorded input voltage.

19. A method according to claim 16, further comprising decreasing the duty cycle of the signal controlling operation of the switching power supply until feedback is effective to regulate the output voltage.

20. An apparatus, comprising:

means for operating a switching power supply having an input voltage and an output voltage in a first mode, wherein the output voltage is regulated by feedback;

means for increasing a duty cycle of a signal controlling operation of the switching power supply until feedback is ineffective to regulate the output voltage;

means for recording the input voltage responsive to feedback being ineffective to regulate the output voltage;

means for adjusting the duty cycle of the signal controlling operation of the switching power supply responsive to the input voltage varying from the recorded input voltage, and means for operating the switching power supply in a second mode, wherein the input voltage is independent of output voltage.

* * * * *

UNITED STATES PATENT AND TRADEMARK OFFICE
CERTIFICATE OF CORRECTION

PATENT NO. : 7,659,701 B1
APPLICATION NO. : 11/677812
DATED : February 9, 2010
INVENTOR(S) : Corey Metsker and Edward Frederick Wright It is certified that error appears in the above-identified patent and that said Letters Patent is hereby corrected as shown below:

In claim 3, Column 9, line 34, please replace "An apparatus according to claim 1" with --An apparatus according to claim 2--.

In claims 4, 5, 6, and 7, Column 9, starting at line 37, please replace the claims as followed:

--4. An apparatus according to claim 1, the primary power supply further comprises a switching power supply having an input and an output.
5. An apparatus according to claim 4, wherein the switching power supply is one of a group consisting of an isolated buck converter, an isolated forward converter, an isolated flyback converter and a non-isolated buck converter.
6. An apparatus according to claim 1, the primary power supply further comprises an isolated buck converter that comprises a first controllable switching device and a second controllable switching device and a gate input coupled to the first controllable switching device and the second controllable switching device, the gate input is configured so that the first controllable switching device is on during a first part of a duty cycle and the second controllable switching device is off during the first part of the duty cycle, and the first controllable switching device is off during a second part of the duty cycle and the second controllable switching device is on during the second part of the duty cycle.
7. An apparatus according to claim 6, further comprising:
a timing circuit having two inputs and an output, the first input is coupled to the gate input; and
a programmable voltage supply coupled to the second input of the timer;
wherein the output of the timing circuit is fedback to the switching power supply to control the duty cycle.--.

Signed and Sealed this

Seventeenth Day of August, 2010

David J. Kappos
*Director of the United States Patent and Trademark Office*